(12) United States Patent
Menard et al.

(10) Patent No.: US 9,975,521 B2
(45) Date of Patent: May 22, 2018

(54) HANDS-FREE SYSTEM FOR MOTOR VEHICLES

(71) Applicant: VALEO COMFORT AND DRIVING ASSISTANCE, Creteil (FR)

(72) Inventors: Eric Menard, Créteil (FR); Ciprian Musat, Créteil (FR); Eric Leconte, Creteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 0 days. days.

(21) Appl. No.: 15/104,722

(22) PCT Filed: Dec. 19, 2014

(86) PCT No.: PCT/EP2014/078741
§ 371 (c)(1),
(2) Date: Jun. 15, 2016

(87) PCT Pub. No.: WO2015/091949
PCT Pub. Date: Jun. 25, 2015

(65) Prior Publication Data
US 2016/0318480 A1    Nov. 3, 2016

(30) Foreign Application Priority Data
Dec. 20, 2013 (FR) .................... 13 03036

(51) Int. Cl.
*G05B 19/00* (2006.01)
*B60R 25/20* (2013.01)
(Continued)

(52) U.S. Cl.
CPC ........ *B60R 25/2045* (2013.01); *B60R 25/246* (2013.01); *G07C 9/00309* (2013.01); *G07C 2209/63* (2013.01); *G07C 2209/65* (2013.01)

(58) Field of Classification Search
CPC combination set(s) only.
See application file for complete search history.

(56) References Cited

U.S. PATENT DOCUMENTS

2002/0125994 A1* 9/2002 Sandau .............. G07C 9/00309
340/5.62
2005/0068712 A1* 3/2005 Schulz .................... E05B 81/78
361/287

(Continued)

FOREIGN PATENT DOCUMENTS

| DE | 10 2004 048329 A1 | 4/2006 |
| DE | 10 2008 052370 A1 | 4/2010 |
| EP | 1 505 734 A2 | 2/2005 |

OTHER PUBLICATIONS

International Search Report issued in PCT/EP2014/078741 dated Jan. 26, 2015 (3 pages).

(Continued)

*Primary Examiner* — Thomas McCormack
(74) *Attorney, Agent, or Firm* — Osha Liang LLP

(57) ABSTRACT

The present invention relates to a hands-free system (SYS) for accessing a motor vehicle (V). Said system includes: a control member (COM) arranged in the motor vehicle (V); a detection member (CAPT) arranged in a door handle (P) of the motor vehicle (V), said detecting member being connected to said control member (COM) and capable of measuring a signal (S) representing a hand (M) approaching; and a sensitivity level (SEN) for which a corresponding threshold value (TH) is defined. Said control member (COM) is capable of sending a hands-free query to the motor vehicle (V) when the measured signal (S) exceeds the threshold value (TH) corresponding to the sensitivity level (SEN). Said hands-free system (SYS) is characterized in that it includes at least two sensitivity levels (SEN1, SEN2), that is, a first high-sensitivity level (SEN1) and a second low- (Continued)

sensitivity level (SEN2), and in that the control member (COM) is also capable of changing the sensitivity level (SEN1, SEN2) of the hands-free system (SYS) in response to a predetermined sequence (SQ) of events.

15 Claims, 2 Drawing Sheets

(51) Int. Cl.
*B60R 25/24* (2013.01)
*G07C 9/00* (2006.01)

(56) References Cited

U.S. PATENT DOCUMENTS

2006/0238385 A1\* 10/2006 Steenwyk ............ B60N 2/0228
          341/33
2010/0264940 A1  10/2010 Tsuchida et al.

OTHER PUBLICATIONS

Written Opinion of the International Searching Authority issued in PCT/EP2014/078741 dated Jan. 26, 2015 (8 pages).

\* cited by examiner

HANDS-FREE SYSTEM FOR MOTOR VEHICLES

TECHNICAL FIELD OF THE INVENTION

The present invention relates to a hands-free access system for a motor vehicle, and an associated method.

It finds a particular but nonlimiting application in the field of hands-free access systems for motor vehicles.

TECHNOLOGICAL BACKGROUND OF THE INVENTION

Such a hands-free access system, known to the person skilled in the art, makes it possible to detect the presence of an object such as a hand of a user of the motor vehicle when he approaches a panel handle with a view to opening the panel. Detection of the approach of the hand of a user causes a central unit of the vehicle to order the launching of a hands-free interrogation destined for an identifier carried by the user. If, subsequent to this detection, an authorized identifier responds to this interrogation, the central unit of the vehicle orders the unlocking of the vehicle. For this purpose, the hands-free system uses a detection member placed in the panel handle which measures the signal representative of a hand that approaches the handle to a certain distance. In order to avoid launching untimely interrogations, it is necessary to define a sensitivity level for the hands-free system, that is to say that the system will undertake the hands-free interrogation only if the detection member detects a signal exceeding a threshold value corresponding to the presence of a user's hand at a predetermined maximum distance.

The adjusting of this sensitivity must take two main factors into account. The first element consists in taking into account only detections corresponding to the approaching of a hand sufficiently close to the handle. It is thus possible to thus avoid untimely interrogations of the hands-free system for events not corresponding an intention to access the vehicle.

Nonetheless, if the sensitivity is adjusted to too high a level, that is to say corresponding to a threshold value in relation to a distance close to contact between the hand and the handle, the hands-free system will not have time to carry out the entire hands-free interrogation sequence and unlock the panel when the user pulls the handle. Consequently, the panel will not be able to open. This is what is commonly called the wall effect.

In this context, the present invention is aimed at solving the drawbacks previously mentioned and in particular to propose a hands-free system which adapts to situations so as to make it possible to limit at one and the same time the wall effect while economizing the energy resources of vehicles by limiting untimely interrogations.

GENERAL DESCRIPTION OF THE INVENTION

To this end the invention proposes a hands-free access system for a motor vehicle comprising:
  a control member placed in the motor vehicle;
  a detection member placed in a panel handle of the motor vehicle, said detection member:
    being connected to said control member;
    being able to measure a signal representative of the approaching of a hand;
  a sensitivity level for which a corresponding threshold value is defined;
  said control member being able to launch a hands-free interrogation with the motor vehicle when the measured signal exceeds the threshold value corresponding to the sensitivity level.

The hands-free system is characterized in that it comprises at least two sensitivity levels, a first high sensitivity level, and a second low sensitivity level, and in that the control member is able to modify the sensitivity level in response to a predetermined sequence of events.

Thus, as will be seen in detail hereinafter, adapting the sensitivity level hands-free systems as a function of predetermined sequences of events will make it possible to adapt to situations so as to make it possible to limit at one and the same time the wall effect while economizing the energy resources of vehicles by limiting untimely interrogations.

According to nonlimiting embodiments, the hands-free system can furthermore comprise one or more additional characteristics from among the following:
  In the presence of the sequence:
    the sensitivity is adjusted to a first high sensitivity level;
    detection of a signal greater than the first threshold value corresponding to the high sensitivity;
  the control member causes the sensitivity to switch from the first high sensitivity level to the second low sensitivity level.
    The switch from the first high sensitivity level to the second low sensitivity level is performed if a first determined time has been exceeded without the measured signal exceeding a third threshold value.
  In the presence of the sequence:
    exceeding of a second predetermined time without crossing of the first threshold value corresponding to the high sensitivity;
  the control member causes the sensitivity to switch from the second low sensitivity level to the first high sensitivity level.
  In the presence of the sequence:
    detection of the crossing of the second threshold value,
    exceeding of a first predetermined time without crossing of a third threshold value;
  the control member leaves the sensitivity at the second low sensitivity level.
  In the presence of the sequence:
    detection of the crossing of the second threshold value,
    detection of the crossing of a third threshold value,
  the control member causes the sensitivity to switch from the second low sensitivity level to the first high sensitivity level.
    The control member is furthermore able to perform the unlocking of the motor vehicle.
    The first threshold value corresponds to a first distance with respect to the panel handle, the second threshold value corresponds to a second distance with respect to the panel handle, the first distance being greater than the second distance.
    The third threshold value corresponds to a third distance with respect to the panel handle and is less than or equal to the second distance.
    Said detection member is composed of a single electrode adapted for covering an interior face of said panel handle of the motor vehicle.
    The signal is representative of a capacitance measurement.
    The first high sensitivity level corresponds to a signal of small value and the second low sensitivity level corresponds to a signal of large value.
    The first threshold value is less than the second threshold value.
    The second threshold value is less than or equal to the third threshold value.

Said control member is furthermore able to wake up computers of the motor vehicle when the measured signal exceeds the threshold value corresponding to the sensitivity level at which hands-free system is placed.

Said control member is furthermore able to turn off said computers if a third predetermined time is exceeded without crossing of said third threshold value.

There is also proposed a method for adjusting the sensitivity level for a hands-free access system for a motor vehicle, said hands-free access system comprising:
- a control member placed in the motor vehicle;
- a detection member placed in a panel handle of the motor vehicle, said detection member:
  - being connected to said control member;
  - being able to measure a signal representative of the approaching of a hand;
- a sensitivity level for which a corresponding threshold value is defined;
- said control member being able to order the launching of a hands-free interrogation when the measured signal exceeds the threshold value corresponding to the sensitivity level.

The method is characterized in that it comprises:
- the modification of the sensitivity level in response to a predetermined sequence of events, said hands-free access system comprising at least two sensitivity levels, a first high sensitivity level, and a second low sensitivity level.

BRIEF DESCRIPTION OF THE FIGURES

The invention and its various applications will be better understood on reading the description which follows and on examining the figures which accompany it.

DESCRIPTION OF EMBODIMENTS OF THE INVENTION

Elements that are identical, by structure or by function, appearing in various figures retain, unless specified to the contrary, the same references.

Figure 1:
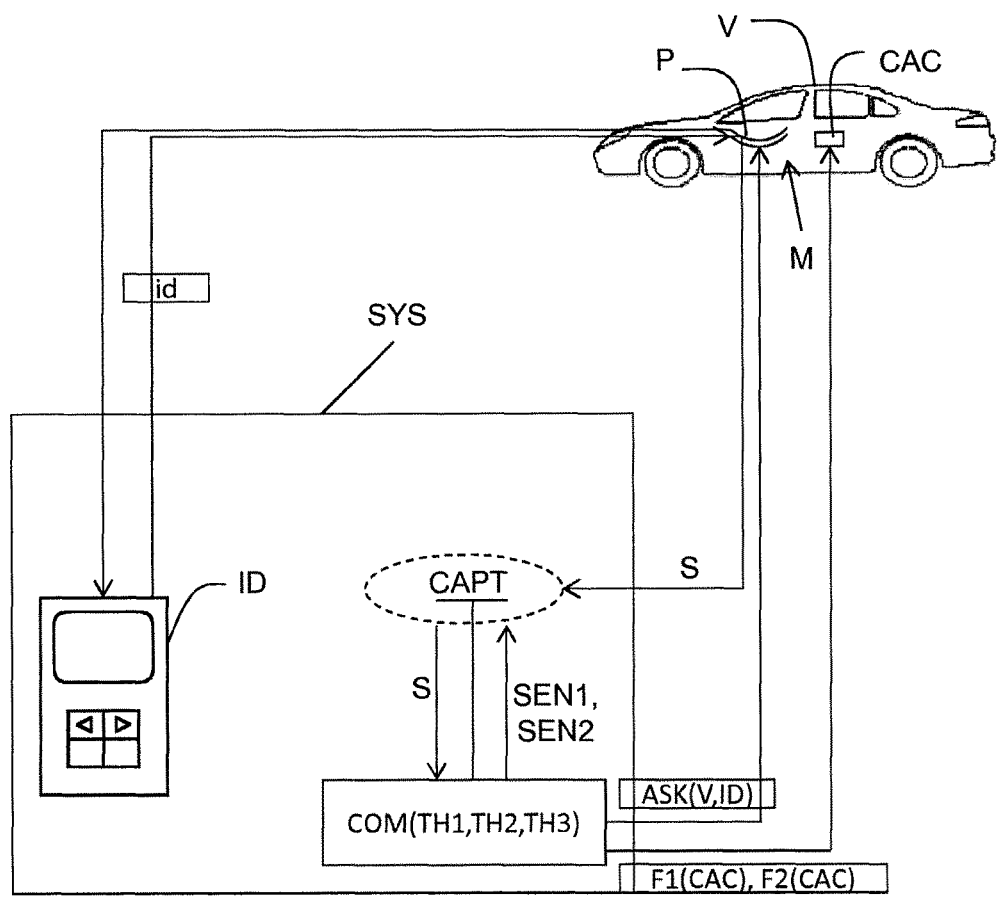
FIG. 1 represents a diagram of a hands-free access system according to a nonlimiting embodiment of the invention.

The hands-free access system SYS for a motor vehicle V is illustrated in FIG. 1.

By hands-free access system SYS is understood the system comprising a user identifier ID customarily called a badge which allows a user of the vehicle to access said vehicle, a detection member, and a control member.

In the subsequent description, the terms high sensitivity level or first sensitivity level will be used interchangeably for the first high sensitivity level SEN1, and low sensitivity level or first sensitivity level for the first low sensitivity level SEN2.

Figure 2:
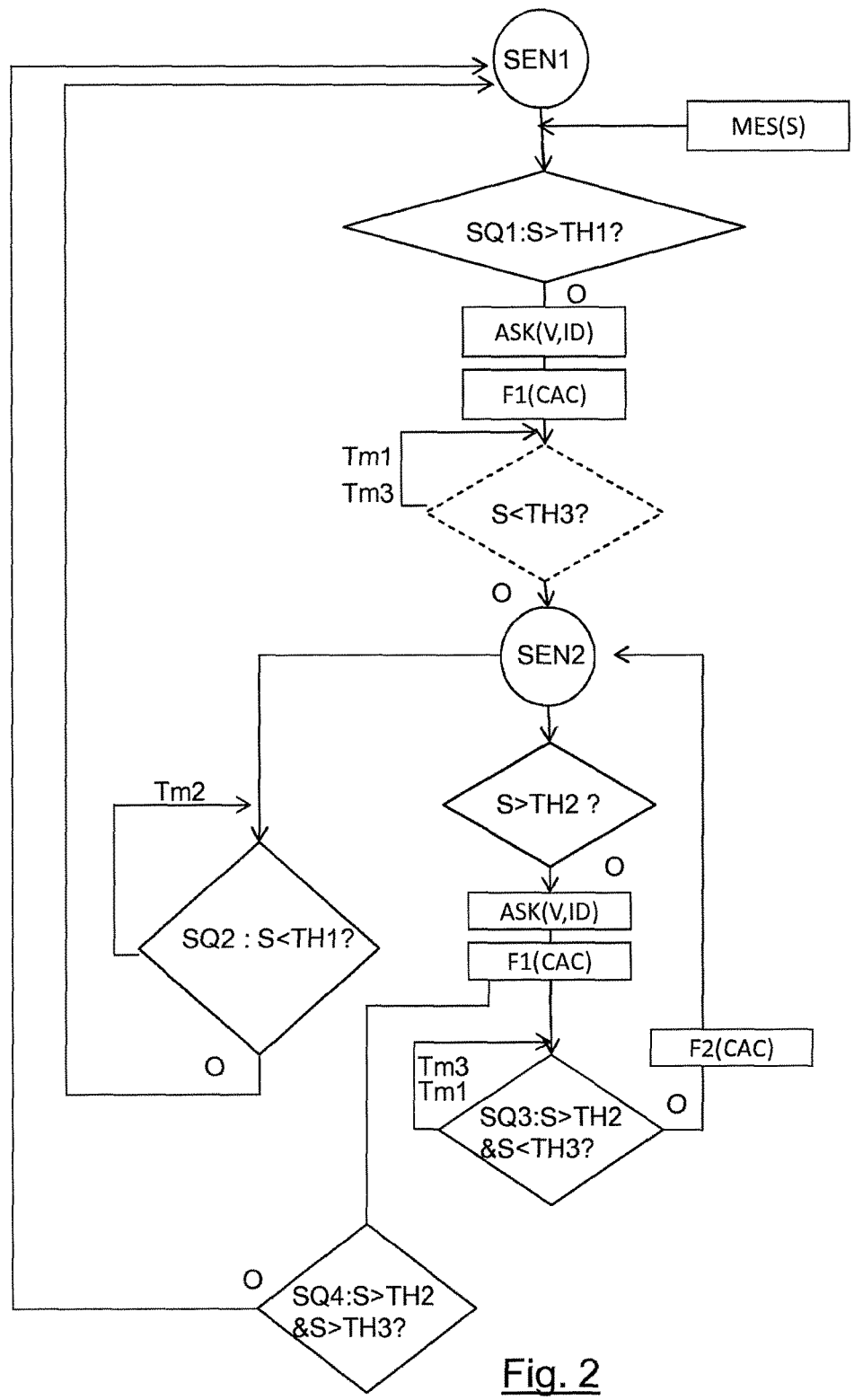
FIG. 2 represents a diagram of a flowchart of an adjustment method implemented by the hands-free system of FIG. 1.

Thus, in a nonlimiting embodiment, the hands-free system SYS comprises:
- a control member COM placed in the motor vehicle V;
- a detection member CAPT placed in a panel handle P of the motor vehicle V, said detection member:
  - being connected to a control member COM;
  - being able to measure a signal S representative of the approaching of a hand M;
- a sensitivity level SEN for which a corresponding threshold value TH is defined;
- said control member COM being able to launch a hands-free interrogation with the motor vehicle V when the measured signal S exceeds the threshold value TH corresponding to the sensitivity level SEN (illustrated ASK (V, ID) in FIGS. 1 and 2).

said hands-free system SYS comprises comprises at least two sensitivity levels SEN1, SEN2, a first high sensitivity level SEN1, and a second low sensitivity level SEN2. The detection member CAPT is customarily called a sensor.

The control member COM is able to modify the sensitivity level SEN1, SEN2 of the hands-free system SYS, in response to a predetermined sequence of events SQ.

In a nonlimiting embodiment, the control member COM is furthermore able to perform the unlocking of a panel of the motor vehicle V.

In a nonlimiting example, the control member COM is an integrated control circuit and more particularly a microcontroller.

In a nonlimiting embodiment, said control member COM is furthermore able to wake up computers CAC of the motor vehicle V when the measured signal S exceeds the threshold value TH1, TH2 corresponding to the sensitivity level at which the hands-free system SYS is placed.

In a nonlimiting embodiment, the first threshold value TH1 corresponds to a first distance d1 with respect to the panel handle P, the second threshold value TH2 corresponds to a second distance d2 with respect to the panel handle P, the first distance d1 being greater than the second distance d2. In a nonlimiting example, the first distance d1 is equal to 10 mm and the second distance d2 is equal to 4 mm.

In a nonlimiting embodiment, said sensor CAPT employs capacitive technology and the signal S is representative of a capacitance measurement.

For this purpose, the detection member CAPT forms a capacitor. This detection member CAPT makes it possible to detect the presence of a hand M in a handle P so as to perform the unlocking of the panel handle P.

In a nonlimiting embodiment, the detection member CAPT comprises a single set of electrodes.

In a first nonlimiting embodiment, the set of electrode(s) CAPT comprises two electrodes (not represented). In this embodiment, the detection member is termed a mutual-capacitance member.

In a second nonlimiting embodiment illustrated in FIG. 1, the detection member CAPT comprises a single electrode which is used with a ground. This single electrode is plane and adapted for covering an interior face of a handle of a panel (trunk, doors) of the motor vehicle. In this embodiment, the detection member CAPT is termed a surface-capacitance member.

The use of such set(s) of electrode(s) being well known to the person skilled in the art, it is not described in greater detail here.

Taken as nonlimiting example in the subsequent description is a capacitive detection member CAPT and a set of electrode(s) comprising a single electrode as detection member CAPT. In this nonlimiting example, the more one approaches the panel handle, the more the value of the signal S increases. Thus, the first high sensitivity level SEN1 corresponds to a signal S (here a capacitance) of small value Sf and the second low sensitivity level SEN2 corresponds to a signal S (here a capacitance) of large value SF.

As will be seen hereinafter, the control device COM will launch a hands-free interrogation as soon as the threshold corresponding to the sensitivity level at which the hands-free system SYS is placed is crossed.

In this manner hands-free system SYS is given the means to anticipate a user accessing the vehicle if of course an authorized identifier is in the vicinity of the vehicle.

Moreover, the control device COM will modify the sensitivity level to a low sensitivity level SEN2, doing so in order to consider the first detection to be an intentional event such as for example a first raindrop. The switch to the low sensitivity level SEN2 will make it possible to clip the signals S relating to subsequent raindrops. That is to say that, although detected by the detection member CAPT, each raindrop will not cause the launching of interrogation by the hands-free system, this launching being effected only if a measured signal S exceeds the corresponding second threshold value TH2.

The manner of operation of the hands-free system is described in greater detail hereinafter with reference to FIG. 2.

It will be noted that the hands-free system SYS is initialized at the first sensitivity level SEN1. Moreover, the measurement of the signal S is performed regularly by the detection member CAPT (illustrated MES(S)).

In a nonlimiting embodiment, the measurement period is between 4 ms and 20 ms.

When said hands-free system SYS is placed at the first sensitivity level SEN1 and there is a detection of a signal S greater than the first threshold value TH1, the control device COM launches a hands-free interrogation.

Indeed when the signal S is greater than the first threshold value TH1, this signifies that the detection member CAPT has measured a representative signal S equivalent to the approaching of a hand to the first distance d1 from the panel handle P of the vehicle V.

This hands-free interrogation is a communication exchange to between the vehicle V and the badge ID with a view to effecting an unlocking of the vehicle if a badge ID authorized to access the vehicle V has been identified.

It will be noted that the first distance d1 is a maximum limit distance of detection of the approaching of a hand to the handle and corresponds to a minimum limit time to perform the hands-free interrogation before the user pulls the handle with a view to opening the panel.

A sufficient time is thus allocated for the hands-free dialog so as to avoid "the wall effect".

It is recalled that the hands-free dialog is performed as follows, in a manner known to the person skilled in the art.

When the control member COM detects that there exists a crossing of a threshold value TH corresponding to the sensitivity level at which the hands-free system SYS is set, it launches a hands-free interrogation destined for a badge ID. This interrogation is generally performed by an antenna placed in the vehicle. In an advantageous manner, provision may be made to place an interrogation antenna in each handle. The antenna dispatches an identification request to the badge ID. The latter returns its identity ID to said antenna.

It will be noted that the signal S representative of a raindrop as the latter trickles down the handle P is generally at least equivalent to the signal S representative of a hand M at the distance d1.

Thus, although this is not the approaching of a hand, the signal S reaches or exceeds the first threshold value TH1, the consequence thereof being nevertheless to launch the hands-free interrogation. This is therefore an undesired interrogation.

Moreover, when said the hands-free system SYS is placed at the first sensitivity level SEN1 and there is a detection of the signal S greater than the first threshold value TH1, said control member COM wakes up the computers CAC of the motor vehicle V. This allows the computers to be able to be activated very rapidly when the vehicle starts up. On startup, the user does not therefore have to wait until the computers CAC have woken up. In nonlimiting examples, the computers CAC are:

the vehicle engine monitor;
the vehicle comfort computer for the air-conditioning and the adjustment of the driver's seat;
the ESP ("Electronic Stability Program") for correcting the trajectories etc.

We shall now detail the adaptability of the hands-free system to various sequence of events SQ.

1) when a first sequence SQ1 in which:
said hands-free system SYS is placed at the first sensitivity level SEN1;
there is a detection of a signal S greater than a first threshold value TH1;
the control member COM causes the hands-free system SYS to switch from the first sensitivity level SEN1 to the second sensitivity level SEN2.

Switching to the second sensitivity level SEN2 will make it possible to filter the signals S representative of the raindrops.

It will be noted that the second threshold value TH2 corresponds to the second sensitivity level SEN2, and corresponds to a second distance d2, smaller than the first distance d1, and makes it possible to detect a hand M which is closer to the panel handle of the vehicle V. In the nonlimiting example taken, the signal S of a hand M which was at the first distance d1 and which has approached even closer to the handle P increases.

Indeed, the closer the hand M approaches the handle P of the vehicle V, the larger the signal S (which is a capacitance). Hence, in a nonlimiting embodiment, the second threshold value TH2 is greater than the first threshold value TH1.

It is this second threshold value TH2 which will make it possible to clip the signals S relating to the raindrops, since such signals S will never be greater than said second threshold value TH2, corresponding to the approaching of a hand to the distance d2.

In a nonlimiting embodiment (illustrated in a dashed lozenge in FIG. 1), the switch from the first high sensitivity level SEN1 to the second low sensitivity level SEN2 is performed if a first determined time Tm1 has been exceeded without a measured signal S exceeding a third threshold value TH3.

This third threshold value TH3 corresponds to a third distance d3 smaller than or equal to the second distance d2 and therefore makes it possible to detect a hand M even closer to the panel handle of the vehicle V.

The latter value d3 no longer allows any a priori doubt as to the intention of a user to open the vehicle V.

In the case of an exceeding of the threshold TH3, the hands-free system SYS remains at the first high sensitivity level SEN1.

In a nonlimiting exemplary embodiment, the first determined time Tm1 (called "timeout") is between 20 ms and 30 ms.

Thus, instead of switching at once to low sensitivity SEN2, one waits for the time Tm1 to see if the measured signal does not exceed TH3.

As will be seen subsequently, the exceeding of the threshold value TH3 corresponds to a hand whose intention is to come into contact with the handle P and which is therefore considered by the hands-free system to be a hand coming into contact with the handle. In the case where the hand comes into contact with the handle, two needless togglings are avoided: toggling from the high sensitivity level SEN1 to the low sensitivity level SEN2, toggling from the low sensitivity level SEN2 to the high sensitivity level SEN1. Indeed, as will be seen subsequently (description of the sequence SQ4), when a hand comes into contact with the handle P, there is a return to the high sensitivity level SEN1.

Subsequent to the detection of the first sequence SQ1, when the detection member CAPT is at the low sensitivity level SEN2, the hands-free system SYS will detect the presence or otherwise of the following sequences SQ2, SQ3, SQ4 and deduce therefrom whether it has stopped raining or whether the hand is no longer in proximity to the vehicle, or else whether or not a hand has touched the panel handle P of the vehicle V.

The various sequences SQ2, SQ3 and SQ4 are described hereinbelow.

2) When the hands-free system SYS at the low sensitivity level SEN2 is in the presence of the following second sequence SQ2:

exceeding of a second predetermined time Tm2 without crossing of the first threshold value TH1;

the control member COM causes the member the hands-free system SYS to switch from the second sensitivity level SEN2 to the first sensitivity level SEN1.

In a nonlimiting embodiment, the second determined time Tm2 (called "timeout") is about ten seconds. In a nonlimiting example, it is equal to 60 seconds.

Thus, it is certain that for a duration Tm2 the measured signal S has not dropped back below the threshold value TH1.

The verification of this second sequence SQ2 makes it possible to verify that it is no longer raining or that there is no longer any hand in proximity to the handle P. The signal S has fallen back below the first threshold value TH1. In this case, one switches back to the first sensitivity level SEN1.

Subsequently, the first sequence SQ1 may occur again.

3) When the hands-free system SYS at the low sensitivity level SEN2 is in the presence of a third sequence SQ3 which is the following:

detection of the crossing of the second threshold value TH2, exceeding of the first predetermined time Tm1 (of the order of 20 ms to 30 ms in a nonlimiting example) without crossing of a third threshold value TH3;

the control member COM leaves the hands-free system SYS at the second sensitivity level SEN2.

It is recalled that, at this level of threshold value TH2, the signal S of a raindrop when the latter is trickling down the handle P is, in the example taken, lower than the signal S of the hand which approaches the handle to the distance d2; said signal S of a raindrop will therefore still be lower than the second threshold value TH2.

It will be noted that, when said hands-free system SYS is set at the second sensitivity level SEN2 and as soon as there is a detection of the signal S greater than the second threshold value TH2, the control device COM launches a hands-free interrogation, stated otherwise it launches said interrogation only when there exists a hand in proximity to the handle P, that is to say at a distance of less than or equal to d2.

Thus, by virtue of the comparison with this second threshold value TH2, one avoids launching hands-free interrogations when only raindrops exist.

At this moment, if the badge ID has been identified and authorized by the vehicle V during the hands-free interrogation which has been launched, the control member COM unlocks the motor vehicle V.

Likewise, in a nonlimiting embodiment, when said hands-free system SYS is placed at the second sensitivity level SEN2 and there is a detection of the signal S greater than the second threshold value TH2, said control member COM wakes up the computers CAC of the motor vehicle V (illustrated F1(CAC)).

However, said control member COM turns off said computers CAC if a third predetermined time Tm3 is exceeded without crossing of said third threshold value TH3.

In a nonlimiting exemplary embodiment, the third predetermined time TH3 is equal to 100 ms (illustrated F2(CAC)).

It will be noted that the third threshold value TH3 corresponds to a third distance d3, less than or equal to the second distance d2, and makes it possible to detect a hand whose intention is to come into contact with the panel handle P of the vehicle V and which is therefore considered by the hands-free system SYS to be a hand coming into contact.

In a nonlimiting exemplary embodiment, the third distance d3 is equal to 3 mm. It is considered that, at this distance, the hand will grasp the handle.

In the nonlimiting example taken, the signal S of the hand which approaches to a distance d2 has a lower value than the signal S of the same hand which approaches a distance d3 from the handle P.

Hence, in a nonlimiting embodiment, the second threshold value TH2 is less than or equal to the third threshold value TH3. In the example taken, the second threshold value TH2 is less than the third threshold value TH3.

After the verification of this sequence SQ3, one remains at the second sensitivity level SEN2.

4) When the hands-free system SYS at the low sensitivity level SEN2 is in the presence of a following fourth sequence SQ4:

detection of the crossing of the second threshold value TH2, detection of the crossing of a third threshold value TH3, the control member COM causes the hands-free system SYS to switch from the second sensitivity level SEN2 to the first sensitivity level SEN1.

The verification of this fourth sequence SQ4 signifies that the user of the vehicle has probably grasped the handle in order to enter the vehicle. It is therefore possible to reinitialize the system to its original sensitivity.

The hands-free access system SYS according to the invention thus makes it possible to implement a method for adjusting the sensitivity level SEN of a hands-free access system SYS for a motor vehicle V, said hands-free access system SYS comprising:

a control member COM placed in the motor vehicle V;

a detection member CAPT placed in a panel handle P of the motor vehicle V, said detection member:

being connected to said control member COM;

being able to measure a signal S representative of the approaching of a hand M;

a sensitivity level SEN for which a corresponding threshold value TH is defined;

said control member COM being able to order the launching of a hands-free interrogation when the measured signal S exceeds the threshold value TH corresponding to the sensitivity level SEN.

The method comprises:

the modification of the sensitivity level SEN1, SEN2 of the hands-free system SYS in response to a predetermined sequence of events SQ, said hands-free system SYS comprising at least two sensitivity levels SEN1, SEN2, a first high sensitivity level SEN1, and a second low sensitivity level SEN2.

Of course the description of the invention is not limited to the embodiments and to the examples described hereinabove.

Thus, in another nonlimiting embodiment, the third threshold TH3 can be equal to the second threshold TH2. In this case, the method is simpler and faster since there is no longer verification of the sequence SQ3.

In another nonlimiting embodiment, said detection member CAPT is composed of two electrodes.

In a nonlimiting embodiment, the detection member CAPT makes it possible to measure smaller and smaller signals S as an object approaches the handle P. Thus, for example, the signal S detected during the first sequence SQ1 will be greater than the signal S of the same object detected during the third sequence SQ3. And the signal S detected during the fourth sequence SQ4 will be the weakest.

In another nonlimiting embodiment, the detection member is non-capacitive; in a nonlimiting example it is an optical sensor. In this case, the signal S is an optical flux.

In a nonlimiting embodiment, the comparisons between the measured signal S and the threshold values TH are performed by the detection member itself.

Thus, the invention described presents the following advantages in particular:
it makes it possible to detect the presence of rain or of a hand approaching during the first sequence SQ1;
it makes it possible to detect the stopping of the rain during the second sequence SQ2;
it makes it possible to detect whether or not the hand has touched the handle (true intention) during the third sequence SQ3 and during the fourth sequence SQ4;
it makes it possible to differentiate between a raindrop which is trickling down the handle and a hand by circumventing the signals relating to the raindrops by virtue of the second sensitivity level SEN2: it thus makes it possible to avoid false detections (raindrop likened to a hand in contact with the handle), and, at the same time, it makes it possible to initiate as quickly as possible the hands-free interrogation so as to avoid "wall effects";
thus, it makes it possible to have a good compromise (high sensitivity level SEN1 and low sensitivity level SEN2) so as to avoid false detections and "wall effects";
it makes it possible to avoid carrying out hands-free interrogations when there are raindrops when the detection member is set at the second sensitivity level SEN2 and it thus avoids excessive consumption of energy by the hands-free system.

The invention claimed is:

1. A hands-free access system for a motor vehicle comprising:
a control member placed in the motor vehicle;
a detection member placed in a panel handle of the motor vehicle, said detection member:
being connected to said control member,
being able to measure a signal representative of the approaching of a hand, and
a sensitivity level for which a corresponding threshold value is defined; and
said control member being able to launch a hands-free interrogation with the motor vehicle when the measured signal exceeds the threshold value corresponding to the sensitivity level; and
at least two sensitivity levels, a first high sensitivity level, and a second low sensitivity level and at least three threshold values,
wherein the control member is also able to modify the sensitivity level of the hands-free system in response to a predetermined sequence of events,
wherein the predetermined sequence comprises placing the hands-free system at a first high sensitivity level;
wherein the control member switches the hands-free system from the first high sensitivity level to the second low sensitivity level upon detection of the measured signal being greater than a first threshold value, and
wherein the switch from the first high sensitivity level to the second low sensitivity level is performed when a first determined time has been exceeded without the measured signal exceeding a third threshold value.

2. The hands-free access system as claimed in claim 1, wherein the predetermined sequence further comprises:
exceeding of a second predetermined time without crossing of the first threshold value;
the control member causes the hands-free system to switch from the second low sensitivity level to the first high sensitivity level.

3. The hands-free access system as claimed in claim 1, wherein the predetermined sequence further comprises:
detection of the crossing of a second threshold value,
exceeding of a first predetermined time without crossing of the third threshold value;
the control member leaves the hands-free system at the second low sensitivity level.

4. The hands-free access system as claimed in claim 1, wherein the predetermined sequence further comprises:
detection of the crossing of a second threshold value,
detection of the crossing of the third threshold value,
the control member causes the hands-free system to switch from the second low sensitivity level to the first high sensitivity level.

5. The hands-free access system as claimed in claim 4, according to which the control member is further able to perform an unlocking of the motor vehicle.

6. The hands-free access system as claimed in claim 1, according to which the first threshold value corresponds to a first distance with respect to the panel handle, the second threshold value corresponds to a second distance with respect to the panel handle, the first distance being greater than the second distance.

7. The hands-free access system as claimed in in claim 3, according to which the third threshold value corresponds to a third distance with respect to the panel handle and is less than or equal to the second distance.

8. The hands-free access system as claimed in claim 1, according to which said detection member is composed of a single electrode adapted for covering an interior face of said panel handle of the motor vehicle.

9. The hands-free access system as claimed in claim 1, according to which the signal is representative of a capacitance measurement.

10. The hands-free access system as claimed in claim 1, according to which the first high sensitivity level corresponds to a signal of small value and the second low sensitivity level corresponds to a signal of large value.

11. The hands-free access system as claimed in claim 1, according to which the first threshold value is less than the second threshold value.

12. The hands-free access system as claimed in claim 3, according to which the second threshold value is less than or equal to the third threshold value.

13. The hands-free access system as claimed in claim 1, according to which said control member is furthermore able to wake up computers of the motor vehicle when the measured signal exceeds the threshold value corresponding to the sensitivity level at which said hands-free system is placed.

14. The hands-free access system as claimed in claim 13, according to which said control member is furthermore able to turn off said computers when a third predetermined time is exceeded without crossing of said third threshold value.

15. A method for readjusting the sensitivity level for a hands-free access system for a motor vehicle, said hands-free access system comprising:
  a control member placed in the motor vehicle;
  a detection member placed in a panel handle of the motor vehicle, said detection member:
  being connected to said control member;
  being able to measure a signal representative of the approaching of a hand;
  a sensitivity level for which a corresponding threshold value is defined;
  said control member being able to order the launching of a hands-free interrogation when the measured signal exceeds the threshold value corresponding to the sensitivity level;
wherein the method comprises:
modification of the sensitivity level of the hands-free system in response to a predetermined sequence of events, said hands-free system comprising at least two sensitivity levels, a first high sensitivity level, and a second low sensitivity level and at least three threshold values,
wherein the predetermined sequence comprises placing the hands-free system at a first high sensitivity level;
wherein the control member switches the hands-free system from the first high sensitivity level to the second low sensitivity level upon detection of the measured signal being greater than a first threshold value, and
wherein the switch from the first high sensitivity level to the second low sensitivity level is performed when a first determined time has been exceeded without the measured signal exceeding a third threshold value.

* * * * *